Oct. 29, 1940.  H. EKSTRÖM  2,219,414
STARTING BURNER
Filed Dec. 29, 1937
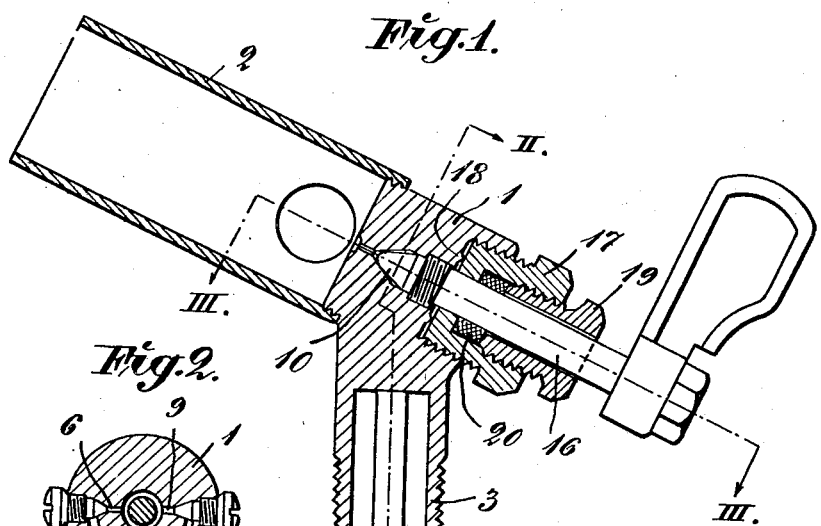
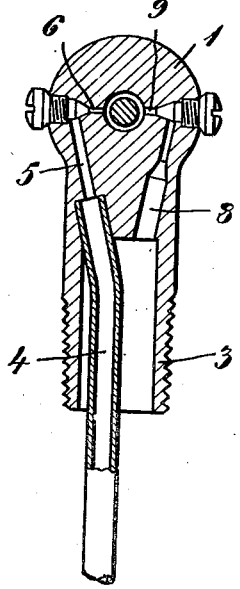
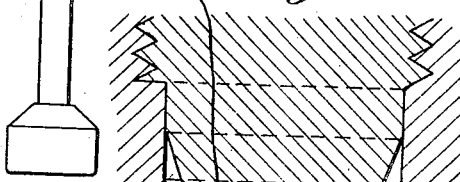
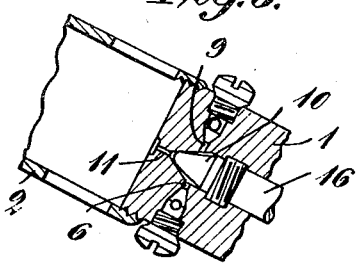
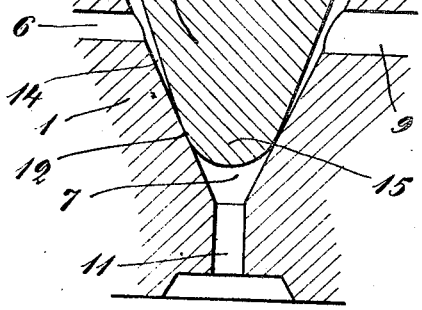
Inventor
Herman Ekström
By Richard K. Stevens
Attorney Patented Oct. 29, 1940

2,219,414

UNITED STATES PATENT OFFICE 2,219,414

STARTING BURNER

Herman Ekström, L. Essingen, Stockholm, Sweden

Application December 29, 1937, Serial No. 182,330
In Sweden January 15, 1937

3 Claims. (Cl. 158—81)

The present invention relates to an improvement in such burners which are used for a preliminary heating of gasification burners for cooking apparatus, lighting apparatus, heating lamps and the like and in which heavy, less volatile fuels, such as kerosene, are used in the starting burner as well as in the main burner.

Such auxiliary or starting burners operate with a very finely divided mixture of air and liquid fuel, and this mixture of air and fuel, which both are subjected to pressure, is prepared in a mixing chamber in which the fuel is atomized or finely divided in the air. The mixing chamber has often the form of one or several channels leading the fuel-air mixture to the outlet nozzle of the burner. When the gasification burner has been heated sufficiently by means of the starting burner, the latter must be shut off so that the supply of fuel and air to this burner is terminated.

This shutting off is connected with certain difficulties as the channels through which the fuel and air are conducted to the mixing chamber and also the channel through which the mixture is discharged to the nozzle outlet are very narrow and apt to be damaged if the shutting off device for example is adapted as a needle valve directly cooperating with the openings of said channels.

According to the present invention a particularly reliable starting burner with shutting-off device is obtained by using a burner provided with, firstly, a conical mixing chamber into which air and fuel are each supplied from the side walls of the chamber by suitable supply channels, and from which the air-fuel mixture is discharged through a short nozzle channel leading from the apex of the conical chamber and arranged in the longitudinal axial line of the chamber, and secondly, with a conical valve axially movable in said mixing chamber and provided with a blunt apex and a smaller conical angle than the chamber and so adapted that the valve in the closed position tightens against the conical chamber wall at a place between the inlet of the fuel and air channel or channels in the mixing chamber and the short nozzle channel leading from the apex of the chamber so that all of the channel openings in the conical chamber will in all positions of the valve be free from mechanical contact with said valve.

According to an embodiment of the invention, the air and fuel channels open into the mixing chamber diametrically opposite each other and at right angles to the longitudinal axis of the chamber.

An embodiment of a starting burner according to the invention is illustrated on the accompanying drawing.

Fig. 1 shows, on an enlarged scale, a longitudinal section through the starting burner.

Figs. 2 and 3 show sections along the line II—II and III—III respectively in Fig. 1.

Fig. 4 shows in a still further enlarged scale a section through the mixing chamber.

1 is the burner housing with the flame tube 2. The burner housing is to be attached to a fuel container under pressure, and it is for this purpose provided with a threaded pipe connection 3 through which a fuel conduit 4 is led. The conduit 4 communicates with a fuel channel 5 in the burner housing 1, the latter channel opening into the conical mixing chamber 7 over a channel 6. The burner housing also contains an air channel 8 leading from the interior of the pipe 3 to a channel 9 opening into the chamber 7. The channels 6 and 9 open suitably into the mixing chamber substantially opposite each other and, if desired, perpendicularly to the longitudinal axis of the chamber, on opposite sides of an axially movable conical valve 10 arranged in the chamber 7. Said channels must be made very narrow with regard to the small quantity of fuel which usually is consumed per time unit in such starting burners and also with a view of obtaining a very fine division of the fuel. The fuel channel diameter may be a few tenths of a millimeter and the air channel diameter some tenth of a millimeter larger.

Therefore, said channels as well as the short nozzle channel 11, which leads from the apex of the conical mixing chamber and also must be made very narrow, are very delicate and easily damageable. Specially their openings in the conical mixing chamber are easily damaged and may even be clogged by mechanical action of the valve, if the valve has a possibility to get into contact with said openings. This applies especially to the nozzle opening in the chamber.

According to the present invention the openings of the channels 6, 9 and 11 opening into the mixing chamber 7 are protected from every mechanical contact with the conical valve 10 by providing the latter with a smaller conical angle than the mixing chamber 7 and with a blunt end 15 and adapt the valve so that it in the closed position will tighten against the conical chamber wall at a place 12 which is situated between the inlet openings in the conical mixing chamber 7 of the fuel and air channels 6 and 9 respectively, and the opening in the same chamber of the short nozzle channel 11 leading from the apex of the chamber.

When the valve 10 opens, air and fuel flow through the conical mixing chamber 7 to the short nozzle channel 11 and are very intimately mixed when passing through the chamber portion 14 having an annular cross-section decreasing in size towards the channel 11.

To facilitate the cleaning of the burner, the stuffing box 19 and the packing stuff 20 used for making the valve spindle 16 tight may be arranged in a sleeve 17 which tightens against a ridge 18 in the burner housing 1 and may be unscrewed from the housing 1. To remove the valve spindle 16 it is therefore not necessary to separate the spindle from the packing stuff 20. The spindle 16 may be pulled out by unscrewing the sleeve 17 with the packing stuff 20 in unchanged position between the sleeve 17 and the box 19.

Having now particularly described the nature of my invention and the manner of its operation what I claim is:

1. A starting burner for heating gasification burners for heating and lighting apparatus, comprising a burner housing, a conical chamber in said housing, a conical valve in said conical chamber and coaxial with the latter, a fuel supply channel which opens with its narrowest portion into the conical wall of said chamber, an air supply channel which opens with its narrowest portion into the conical wall of said chamber, said narrow opening portions of the fuel and air channels being directed to force the fuel and air to impinge directly against opposite portions of said conical valve member, a very short and very narrow discharge nozzle for fuel-air mixture leading axially from the apex of said conical chamber, the outlet end in said housing of said discharge nozzle forming the igniting spot of the starting burner, means for axially moving said valve member to control the discharge of fuel-air mixture, said conical valve member having a blunt apex and a smaller conical angle than said conical chamber and forming together with the surrounding wall of the latter an annular conical mixing chamber, the width of passage of which is narrowing towards the apex of the valve member, the place of contact between said conical chamber wall and said conical valve member in the closed position of the latter being situated between the port of said discharge nozzle on one side and the ports of the fuel and air channels on the other side to leave said ports out of mechanical contact with the valve member in all positions of the latter, a portion of said conical chamber forming an extension of said annular conical mixing chamber and having an increased area of passage compared with the latter being situated between the blunt apex of the valve member and said port of the discharge nozzle.

2. Starting burner according to claim 1, in which the air and fuel channels open into the mixing chamber at points substantially diametrically opposite each other and at substantially right angles to the longitudinal axis of the mixing chamber.

3. A starting burner for heating gasification burners comprising, a burner housing having a conical mixing chamber therein, a very narrow port in the conical wall of said chamber communicating with a fuel conduit, a very narrow port in the conical wall of said chamber communicating with an air conduit, a very short, very narrow discharge conduit leading from the apex of said chamber to the point of ignition, and a conical valve in said chamber adapted to control said discharge conduit.

HERMAN EKSTRÖM.